(No Model.)

J. A. COOK.
SALT DRIER.

No. 337,560. Patented Mar. 9, 1886.

WITNESSES:

INVENTOR:
J. A. Cook
BY Munn & Co.
ATTORNEYS.

UNITED STATES PATENT OFFICE.

JOSEPH A. COOK, OF AUBURN, NEW YORK.

SALT-DRIER.

SPECIFICATION forming part of Letters Patent No. 337,560, dated March 9, 1886.

Application filed June 1, 1885. Serial No. 167,316. (No model.)

*To all whom it may concern:*

Be it known that I, JOSEPH A. COOK, of Auburn, in the county of Cayuga and State of New York, have invented a new and Improved Salt-Drier, of which the following is a full, clear, and exact description.

Reference is to be had to the accompanying drawings, forming part of this specification, in which similar letters of reference indicate corresponding parts in all the figures.

Figure 1:
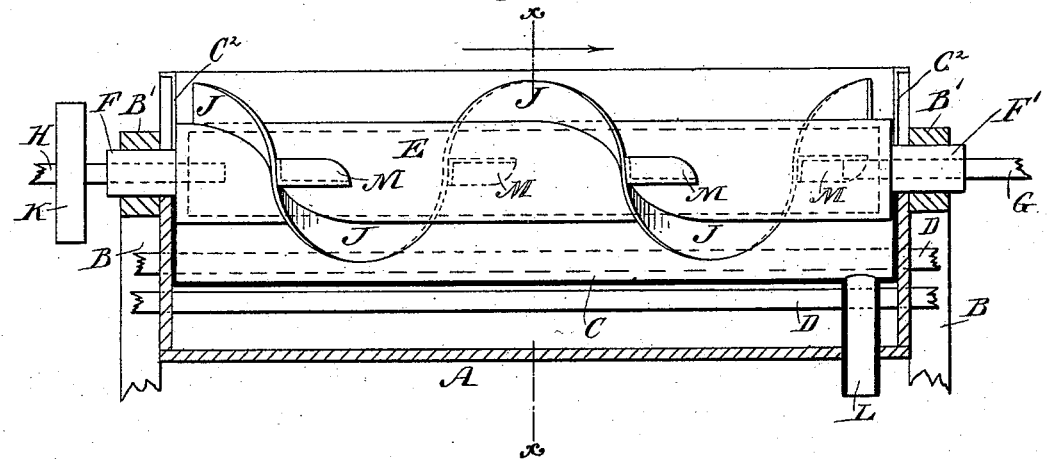
Figure 2:
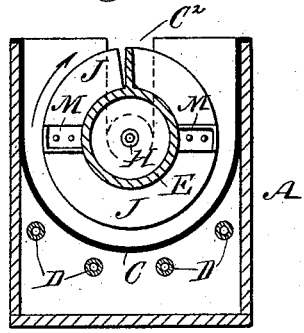
Figure 3:
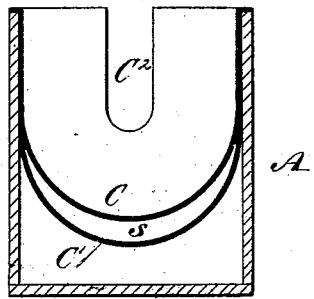

Figure 1 is a sectional elevation of my new and improved salt-drier. Fig. 2 is a transverse sectional elevation of the same on line $x\ x$ of Fig. 1, and Fig. 3 is a similar view showing a modification.

The invention will first be described in connection with the drawings, and then pointed out in the claim.

A represents a casing, preferably of wood, held by upright frame-pieces B B.

In the casing A is placed the trough C, preferably of sheet metal, in which trough the salt to be dried is placed. The trough C may be jacketed, as shown at C', Fig. 3, so that steam may be supplied to space $s$, for heating the trough, or steam-pipes D may be placed in the wooden casing A, in close proximity to the bottom of trough C, as shown in Fig. 2, for heating the trough and the salt thereon.

E is a heating-drum, also for heating and drying the salt in the trough C. This drum is closed at its ends by suitable heads, which are provided with hollow gudgeons F F', by which the drum is journaled in the cross-pieces B' B' of the frames B B. The ends of the trough C are slotted, as shown at $C^2\ C^2$, to receive the gudgeons F F', and steam is supplied to the drum E for heating it through inlet-pipe G and exhausted through pipe H. The pipes G H are fitted in the hollow gudgeons F' F, respectively, as shown.

Upon the outer surface of the drum E is secured the flange J, that winds spirally around the drum, as shown clearly in Fig. 1, so that as the drum E is revolved by a belt or pulley, K, or otherwise, the flange will act first as an agitator for the salt, and secondly as a conveyer for moving the salt along in the trough C to the discharge pipe L.

Cast with or attached to the spiral flange J are several flanges, angle-irons, or boxes, M M, which, as the drum revolves, serve as elevators and act to scoop the salt from the bottom of the trough C and elevate it above the drum E, and then discharge it over and upon the heated drum, which greatly accelerates the drying of the salt.

This apparatus is applicable also for drying sugar and other fine substances. By heating both the trough C and drum E the drying is done very rapidly, and by employing the wooden casing A practically all loss of heat by radiation from the sides of the trough C is obviated.

I am aware that the hollow drying-cylinder has been provided with a spiral flange on its outer surface and inclined wings extending between said spirals, and I do not claim such as of my invention.

Having thus described my invention, what I claim as new, and desire to secure by Letters Patent, is—

A salt-drier consisting of the box A, having the heating-pipes in its lower part, the trough C, arranged above the heating-pipes and provided with the discharge-pipe L, the drum E, provided with the hollow gudgeons F F', and the spiral flange J, having the angle-irons M secured thereto and forming elevators, and the steam-pipes G H, projecting through the hollow gudgeons into the drum, substantially as shown and described.

JOSEPH A. COOK.

Witnesses:
R. M. VAIL,
F. P. TABER.